Oct. 17, 1961 C. L. MORSE 3,004,575
SUPPLEMENTAL PNEUMATIC TIRE
Filed Sept. 6, 1960 2 Sheets-Sheet 1

INVENTOR.
CHARLES L. MORSE
BY Barlow & Barlow

Oct. 17, 1961 C. L. MORSE 3,004,575
SUPPLEMENTAL PNEUMATIC TIRE
Filed Sept. 6, 1960 2 Sheets-Sheet 2
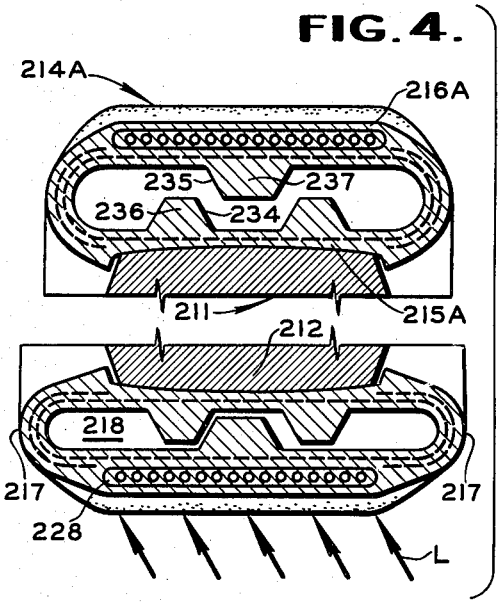
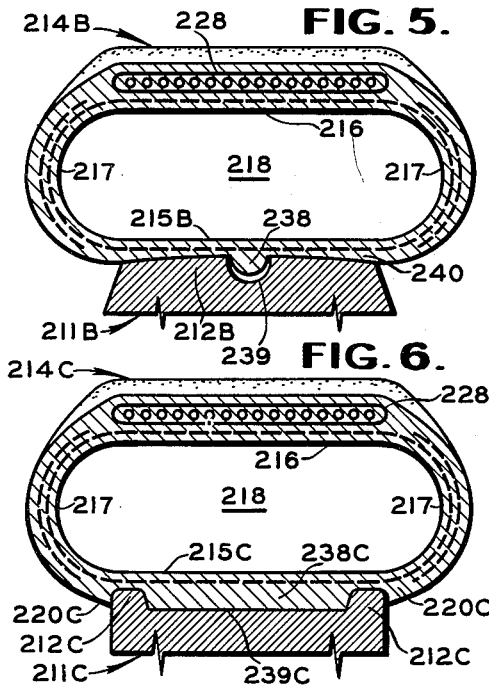
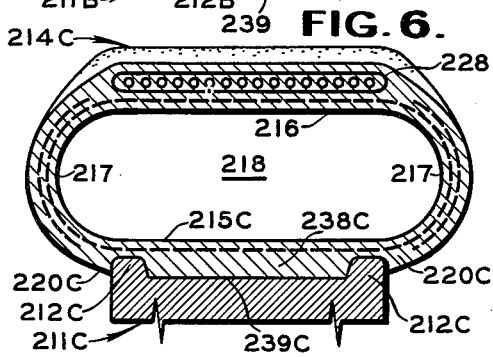
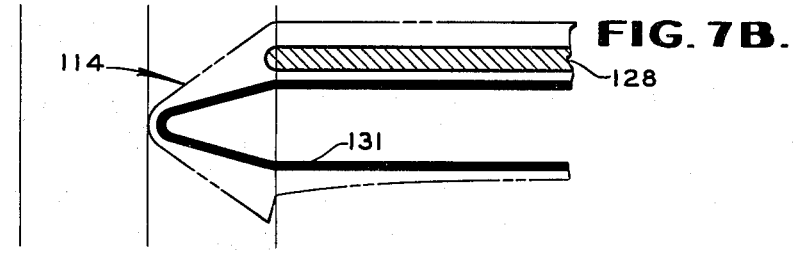
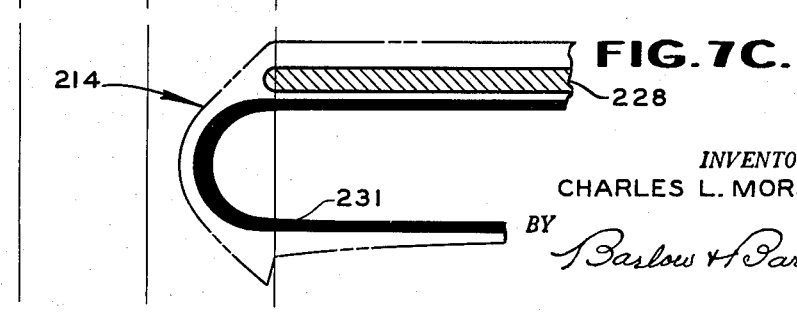
INVENTOR.
CHARLES L. MORSE
BY
Barlow & Barlow

United States Patent Office 3,004,575
Patented Oct. 17, 1961

3,004,575
SUPPLEMENTAL PNEUMATIC TIRE
Charles L. Morse, P.O. Box 156, South Dartmouth, Mass.
Filed Sept. 6, 1960, Ser. No. 54,301
14 Claims. (Cl. 152—175)

This invention relates to improvements in vehicle tires, particularly to a supplemental tread which is to be mounted pneumatically onto a conventional automobile, truck, or airplane tire, or that may be adapted to be pneumatically mounted directly on any type of wheel rim. This invention is related to the disclosures shown in my co-pending application Serial No. 846,394 and Serial No. 846,381, both filed October 14, 1959. The supplemental pneumatic tire of this invention when installed on a conventional tire provides a vehicle wheel with a larger bearing area, better traction, and greater ground clearance. When installed directly on a wheel rim, the supplemental tire may be mounted or removed with minimum effort.

Although supplemental treads, tires, or so-called "shoes" of the above character heretofore have been proposed for difficult snow-and-mud traction, those supplemental tires with which I am familiar are either difficult or impossible to install and remove, expensive to manufacture or unable to satisfactorily meet side thrust loads. These prior shoes generally have an innermost diameter substantially less than the outermost diameter of the conventional tire, and to place the smaller diameter over the larger diameter is well beyond the ability of the average motorist. Therefore, these prior shoes offer no advantage over changing the usual tire to a snow tire or other specialized conventional tire.

An object of the invention is to provide for improvements in the prior supplemental tire of the above character.

A more specific object of the invention is to provide a supplemental tire of the above character so constructed that when in the deflated condition, sufficient clearance will be had to permit it to be readily slipped on the conventional vehicle tire without deflating same and without the use of tools.

Another object of the invention is to provide a supplemental tire of the above character so constructed that when positioned on a conventional vehicle tire and inflated, the radially-inner wall thereof will deform in cross-section into the configuration of the portion of the conventional tire over which it is placed to be firmly held thereon.

Another object of the invention is to provide a supplemental tire of the above character constructed in cross section in the shape of a contracted or flattened oval, so that after deflation the radially-inner wall will automatically return to the original or retracted position for easy removal of the tread.

Another object of the invention is to provide a supplemental tire of the above character so constructed as to provide a high degree of resistance to side thrust.

Another object of the invention is to provide a supplemental tire of the above character without excessive diameter and still provide a sufficient tread mass for the purpose of use intended.

Another object of the invention is to provide a supplemental tire of the above character so constructed that it is of relatively narrow width to fit within the limits of existing vehicle wheel wells or mud guards.

Another object of the invention is to provide a primary tire of the above character so constructed that it may be easily and quickly pneumatically mounted or deflated and removed from a wheel rim.

Still another object of the invention is to provide a supplemental tire of the above character that is relatively easy and inexpensive to manufacture.

With these and other objects in view, the invention consists of certain novel features of construction as will be more fully described and particularly pointed out in the appended claims.

In the accompanying drawings:

FIGURE 4 is a fragmentary view showing the top and bottom cross sections of a modified supplemental pneumatic tire, the top cross-sectional view showing the normal installation, and the bottom cross-sectional view showing normal road loads and side thrust being applied;

FIGURE 5 is a fragmentary sectional view showing an alternate form of construction with a central ring-and-groove arrangement to prevent axial shift between the conventional tire and the supplemental tire;

FIGURE 6 is a fragmentary sectional view showing an alternate form of construction with the supplemental tire adapted to fit a wheel rim;

FIGURES 7A, 7B, and 7C are diagrammatic representations illustrating three basic forms of supplemental pneumatic tires, FIGURE 7A being of half-pleat construction, FIGURE 7B being of whole-pleat construction, and FIGURE 7C showing arcuate side wall construction and being the subject of the present invention.

Figure 3:
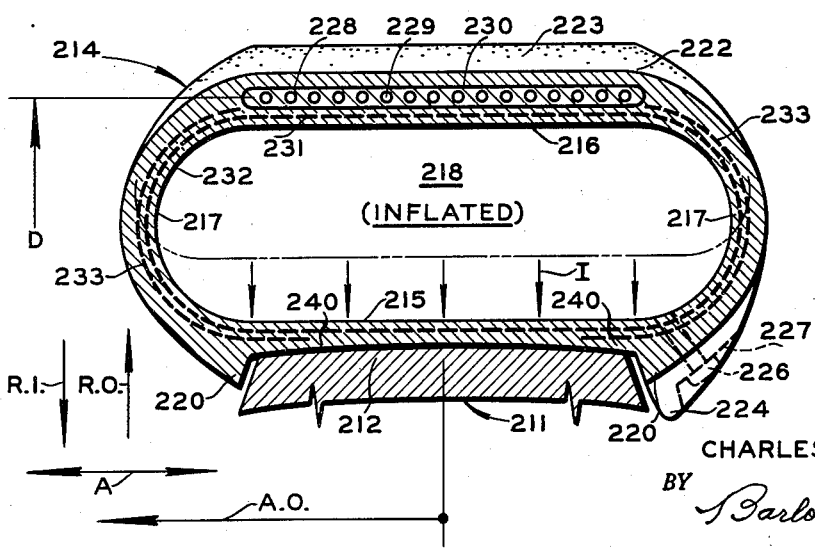
FIGURE 3 is a sectional view taken substantially along line 3—3 of FIGURE 1.

To prevent confusion when describing various features of the supplemental pneumatic tire, direction arrows are shown adjacent to FIGURE 3. Arrow A indicates axial direction; arrow A.O. indicates axially-outer direction; R.I. and R.O. indicate radially-inner and radially-outer directions respectively.

The supplemental pneumatic tire or shoe of the present invention may be generally described as an inflatable annulus having a higher tread mass and larger print area than the conventional vehicle tire and is adapted to be easily mounted on the existing tires of a vehicle so as to adapt its use to snow, ice, mud, sand or wherever extreme traction and large bearing surfaces are needed. It is comparable to some extent to conventional tire chains but is more dependable in operation, gives greater road clearance, permits higher road speeds, and affords smoother riding on bare pavements.

Additionally, the supplemental pneumatic tire of the present invention may be used as a replacement for a spare tire. When the supplemental tire is constructed with a suitably strong annulus reinforcement, a generally circular shape will be retained with the tire in place. Thus, when the supplemental tire is installed over a punctured or flat vehicle tire, the latter is squeezed evenly inward over its entire circumference and will retain a circular shape rather than flatten at point of contact with the road.

In the present invention, the mass of the shoe is distributed and arranged so as to provide an inflatable annulus with a strong, semi-rigid radially-outer wall and a flexible radially-inner wall. When deflated, the resulting annulus has a sufficiently large inner diameter to be easily slipped over the vehicle tire on which it is to be mounted, and when inflated, the radially-inner wall will move into complemental relation with the vehicle tire, with the ridges or abutments adjacent to, or engaging, the side wall of the vehicle tire. Thus, the supplemental shoe is pneumatically held firmly in position.

Figure 1:
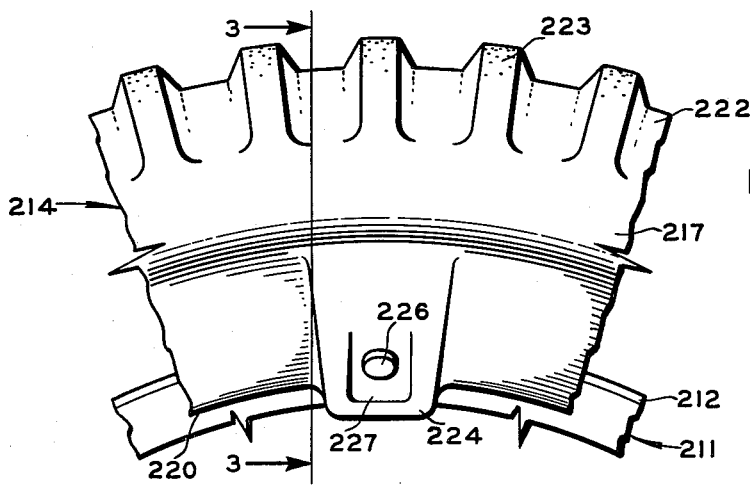
FIGURE 1 is a side view of a fragmentary section of a supplemental tire or shoe embodying my invention and shown pneumatically mounted on a conventional vehicle tire.

Referring to FIGURES 1 and 3, 211 designates generally either a conventional tire or a solid wheel, these two items being equal and interchangeable so far as the installation of the supplemental pneumatic tire is concerned. The tire or wheel 211 has the usual tread mass or rim portion 212. The supplemental pneumatic tire 214 which is the subject of the present invention hereinafter will be referred to as an "overtire" for the sake of clarity in distinguishing between it and the conventional tire 211 on which it is mounted. The overtire is preferably a resilient casing, essentially a flattened oval in cross section, made by wrapping or winding a rubberized reinforcing fabric crosswise or spirally about a flattened rubber lining until the desired number of layers have been built up with additional spot reinforcements as desired. This structure together with the annulus 228 and suitable cleats is then molded or vulcanized to approximately the cross-sectional shape shown in FIGURE 2. The ultimate molded result may be said to effectively form a flattened, oval-shaped, inflatable annulus that is mounted inside a semi-rigid reinforcing annulus. Upon inflation of the overtire, the reinforcing annulus 228 prevents radially outward expansion of the inflatable annulus but allows a radially-inward movement of the radially-inner wall so that the overtire 214 clamps firmly against the conventional tire 211, as will now be explained in more detail.

Figure 2:
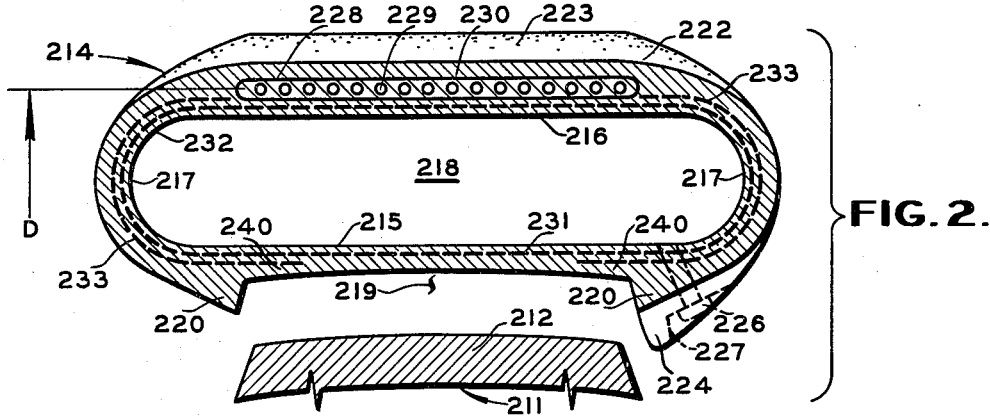
FIGURE 2 is a sectional view taken on a wheel radius of an uninflated supplemental tire.

Referring to FIGURE 2, the overtire is constructed in the form of an annular chamber, substantially flattened in cross section and having spaced annular walls 215 and 216 which are integrally joined at their axially-outer edges by the arcuate side walls 217. Thus, there is formed a sealed annular cavity or chamber 218 which is adapted to receive and hold a gas, such as air, under pressure. The walls 215 and 216 are normally straight in the axial direction of the overtire. The wall 215 which is the radially-inner wall is smooth on the side facing chamber 218. On the opposite (or radially-inward) face of wall 215, there is a recess 219, formed by circumferential ridges or lips 220 at the edges of the recess, said ridges or lips extending radially inward. The space between the ridges 220 is slightly larger than the tread portion 212 of vehicle tire 211. The radially-inner wall 215 and the radially-outer wall 216 are joined together by the arcuate side wall portions 217 which are relatively heavily constructed in order to resist side thrust or axial load, as will presently be described. A tread mass 222 projects radially outwardly from the radially-outer wall 216 and contains a plurality of spaced cleats 223 (see FIGURE 1) which extend into the sides 217 in continuation thereof. A plurality of lugs or abutments 224 (see FIGURES 1, 2, and 3) are located on ridge 220 and fair into side 217, the abutments 224 projecting radially inward from wall 215 to help align the overtire when it is being installed. Additionally, abutment 224 prevents misalignment or overtire cross-over during a flat tire or other sudden loss of air. In FIGURES 1, 2, and 3, an air valve mechanism 226 is mounted within recess 227 of one abutment 224, and said mechanism 226 projects through wall 215, providing a means to inject air under pressure into chamber 218.

The radially-outer wall 216 is strengthened by a reinforcing annulus 228 with circumferential steel wires 229. The primary purpose of the annulus 228 is to provide a strong radial restraint for the overtire in order to maintain a relatively fixed diameter D (shown in FIGURES 2 and 3) of the overtire and to prevent crowning under air pressure within chamber 218 without unduly thickening wall 216. When the average overtire is inflated, the total pressure on wall 216 runs into many throusands of pounds. Additionally, when the overtire is in operation, centrifugal force, heat, etc., further tend to radially expand wall 216. Thus the need for a strong reinforcing annulus 228 is apparent and additional purposes of the annulus 228 will hereinafter be described. In an axial direction, the wires 229 are bound together with rubber and, optionally, integrated by a rubberized cross fabric 230 of any suitable material. Preferably walls 215, 216, and 217 are made in continuity of construction by a continuous, spirally-wound rubberized fabric 231 about the rubber lining 232. Rubberized fabric 233 reinforces the side portions 217. For clarity of drawing, fabrics 231 and 233 are shows as only a single dash line in most views. However it is to be understood that several plies of rubberized fabric are intended and additional reinforcing fabric may be added at critical stress or wear points as needed.

When the overtire 214 is to be mounted on the usual vehicle tire, the wheel, without deflating the tire 211, is raised from the ground in the usual manner as when changing a tire. As the innermost diameter of the annular ridge 220 of the overtire 214 is made slightly larger than the periphery of the casing 211 on which the overtire is to be mounted, the overtire 214 is readily slipped on the casing 211, as shown in FIGURE 2. Air under pressure may now be introduced through valve mechanism 226 into chamber 218. It will be seen in FIGURES 2 and 3 that the air pressure when applied is almost entirely directed against walls 215 and 216, and to a lesser extent against side walls 217. Therefore, walls 215 and 216 have a tendency to move apart. As previously noted, the radially-outer wall 216 is restrained by annulus 228 at the fixed diameter D as shown in FIGURES 2 and 3. Therefore, only the radially-inner wall 215 is free to move, firmly meeting with the tread or rim 212 of tire or wheel 211. The radially-inward travel of wall 215 is designated by the arrows I in FIGURE 3. As shown in FIGURES 1 and 3, the ovetire 214 when inflated to normal pressure will engage the entire circumference of an average size automobile tire with a force well in excess of 10,000 lbs. Thus there will be no rotational slippage between tire 211 and overtire 214. Releasing the air through valve mechanism 226 permits wall 215 to move radially outwardly so that the overtire is easily and quickly removed when the wheel has been jacked up.

The construction and operation of a typical overtire has been described. Various features, alternate designs, and construction details will now be analyzed:

The ridge portions 220 as shown in FIGURES 1, 2, and 3 usually extend continuously about the circumference. However, it is also perfectly feasible to use spaced segments of ridge 220 in lieu of a continuous ridge portion, as shown in FIGURES 6 of my related applications above referred to, either form being perfectly acceptable for the function intended. Wall 215 is thickened at 240 so that the wall conforms to the contour of tread 212 and also so that wall 215 is reinforced at a critical flexing point.

A prime requirement for a successful overtire is the ability to meet axial load or side thrust. The semi-rigid annulus 228 is essential for this function, which will now be more fully described: The annulus 228 is substantially a straight line in cross section, and it is a section of a cylinder when taken as an entity by itself. Therefore, when a transverse or axial load is applied to annulus 228, as at the point of contact with the road surface, the annulus 228 acts as a monocoque or stressed-skin structure and distributes the load over a wide area. As a result, the overtire 214 cannot be dislodged locally from tire casing 211 but may only be removed simultaneously over a large portion of tire casing 211. Since the lip 220 grips the casing over the entire circumference thereof, it would be virtually impossible to tear the overtire 214 loose from said casing 211 by a transverse load applied on tire 214 during skidding action of the vehicle.

The axial load is transmitted from the radially-outer wall 216 to the radially-inner wall 215 through the thickened side walls 217, which may be reinforced with additional rubberized fabric 233 as needed. Because of the load distributing action of annulus 228 as described above, the side walls 217 are capable of handling relatively heavy axial loads. This axial load or side thrust is then transmitted into tire casing 211 through ridges 220 and also by friction between wall 215 and the tread 212 of tire casing 211.

FIGURE 4 shows a modified form of construction whereby axial load may be transmitted between the radially-inner and outer walls by the use of internal abutments. Overtire 214A has a modified wall 216A with an annular ridge 237 with shoulder 235 that under heavy load conditions may meet with corresponding shoulder 234 of a similar annular ring 236 attached to wall 215A. The top half of FIGURE 4 shows the normal static position of the overtire 214A without load, and the bottom half of FIGURE 4 shows the abutments meeting under heavy load conditions, denoted by the arrows L, as when a vehicle is severely cornering or skidding sideways. Whereas only one set of abutments is shown here, a multiple set of abutments may be used depending on the individual design and the intended use of the overtire.

FIGURE 5 shows a modified overtire 214B whereby the usual circumferential ridges 220 have been dispensed with in favor of a centrally-spaced annular ridge 238 on the radially-inner face of wall 215B, said ridge 238 fitting into a complemental recess 239 in the tread 212B of tire 211B. Wall 215B is thickened at 240 so that the wall conforms to the contour of tread 212B and also so that wall 215B is reinforced at a critical flexing point. Although only one ridge 238 and groove 239 combination is shown, it may be used in plurality if so desired.

FIGURE 6 shows a modified overtire 214C with a modified radially-inner wall 215C adapted to meet a wheel rim or flanges 212C of wheel 211C. The wall 215C has an annular portion 238C that fits within the complemental recess 239C formed by flange portions 212C. Optionally, the overtire may also have circumferential ridges 220C. The overtire 214C shown in FIGURE 6 is merely representative of many possible variations of the radially-inner surface of wall 215C to adapt it to meet various rim designs. Overtire 214C is intended for use primarily with carts, wagons, and dollies.

FIGURES 7A, 7B, and 7C are schematic cross-sectional views illustrating the basic differences between the three primary versions of the overtire. Overtire 14 shown in FIGURE 7A is described in my patent application Serial No. 846,394 filed on October 14, 1959; overtire 114 shown in FIGURE 7B is described in my patent application Serial No. 846,381 filed October 14, 1959; overtire 214 shown in FIGURE 7C is the subject of the present invention. Overtire 14 has a relatively wide track; it is constructed so that its side portion is in the form of a half pleat. The rubberized fabric 31 encircles the reinforcing annulus 28. Overtire 114 has a relatively narrow track and is constructed so that its side portions are in the form of a single, whole pleat. The rubberized fabric 131 passes inside reinforcing annulus 128 and is thus radially restrained by it. Overtire 214 is similar to overtire 114 except that overtire 214 has arcuate side portions instead of whole-pleat side portions. Overtire 14 resists axial loads by tension in the side portion; overtire 114 resists axial loads by a combination of tension and compression in the side portion; overtire 214 resists axial load by the bending of the side portion.

One purpose of the present comparison is to show that the whole-pleat section of overtire 114 and the arcuate side section of overtire 214 are substantially narrower than the half-pleat section of overtire 14. In other words, although all three overtires have the same radially-inward travel, overtires 114 and 214 can accomplish this with one half the overhang of overtire 14. Thus overtires 114 and 214 are better adapted for use on vehicles with limiting mud guards or wheel wells.

The relatively narrow overtire 214 and several variations have been representatively described herein. In summary, the improved overtire is easily manufactured at low cost, it is easily installed and removed, and it has good ability to resist side thrust or axial load.

I claim:

1. In combination with an inflatable hoop-shaped member, a supplemental overtire adapted to be pneumatically mounted on said hoop-shaped member comprising an annular resilient casing having an annular chamber therein, said casing comprising a fabric reinforced rubber lining, said casing in cross section having a substantially straight radially-outer wall and a substantially straight radially-inner wall, said walls joined at their axially-outer extremities by fabric-reinforced arcuate side wall portions, all of said wall portions integrally formed of continuous rubberized fabric, said radially-outer wall having circumferentially extending wire reinforcements spaced across the width thereof and on the radially-inner surface and traction mass on the radially-outer surface thereof, said wire reinforcements being centrally located and being of a substantially narrower width axially than the overtire width, the arcuate side wall portions being more resilient than said wire reinforced center portion, said radially-inner wall being resilient throughout its width, said radially-inner wall being adapted to engage the periphery of said hoop-shaped member upon overtire inflation, means for axially engaging said hoop shaped member to prevent axial shift between said overtire and said member when said overtire is inflated, said radially-inner wall when said overtire is uninflated having a diameter slightly larger than the diameter of said member, whereby said overtire may be slipped onto said member without deflating the latter, and means for introducing air under pressure into said chamber to inflate said overtire, said air pressure forcing radially inwardly the said radially-inner wall to firmly engage the periphery of said member, and said radially-inner wall retracting radially outwardly upon the release of said air pressure to permit easy removal of said overtire.

2. The structure as defined in claim 1 wherein the supplemental overtire includes means for transmitting axial thrust from said radially-outer wall to said radially-inner wall, said means comprising at least one circumferential ridge projecting inwardly into said chamber from said radially-inner wall and at least one similar circumferential ridge projecting into said chamber from said radially-outer wall, the side shoulders of said ridges abutting upon axial loads being applied to said overtire.

3. The structure according to claim 1 wherein the means for axially engaging said hoop-shaped member comprises circumferentially extending ridge portions disposed at either axially-outer portion of said radially-inner wall, said ridge portions having a face thereof which is adapted to engage the radially-outer circumferential marginal side edges of said hoop-shaped member.

4. The structure according to claim 1 wherein the hoop-shaped member has an annular recess and the means for axially engaging said hoop-shaped member comprise a circumferential annular ridge located on the radially-inner wall of said casing and projecting radially inwardly therefrom to engage said annular recess provided in said hoop-shaped member.

5. The structure according to claim 1 wherein one axially-outer portion of said radially-inner wall of said casing is provided with a series of circumferentially-spaced abutments, said abutments extending radially inwardly so as to engage the peripheral side portions of said hoop-shaped member and facilitate installation of the casing thereon, said abutments also preventing said overtire crossover during sudden loss of air pressure.

6. In combination with a vehicle tire having a peripheral tread portion, a supplemental overtire pneumatically mounted on said vehicle tire comprising an annular resilient casing having an annular chamber therein, said casing in cross section comprising a generally flattened oval tubular rubber lining, said lining extending substantially beyond the tread portion of said vehicle tire, said lining being encircled crosswise and about with rubberized reinforcing fabric to form an integral inflatable annulus, the axial outer portions of said inflatable annulus each forming a general 180° arcuate side wall portion, a semi-rigid annulus circumferentially encircling said inflatable annulus to prevent its radial expansion, said semi-rigid annulus comprising circumferential wire reinforcements, and said semi-rigid annulus being substantially narrower axially than said inflatable annulus, said annular resilient casing having a radially-inner wall and said annular resilient casing together with said semi-rigid annulus forming a radially-outer wall, said casing having a tread mass on the radially-outer wall and a surface on said radially-inner wall adapted to meet the periphery of a vehicle tire when mounted thereon, said radially-inner wall having means for axially engaging the vehicle tire to prevent axial shift between said overtire and the vehicle tire when said overtire is inflated, said radially-inner wall when said overtire is uninflated having a diameter slightly larger than the diameter of the vehicle tire upon which it is to be applied whereby said overtire may be slipped onto the vehicle tire without deflating the same, and means for introducing air under pressure into said chamber to inflate said overtire, said air pressure forcing radially inwardly said radially-inner wall to firmly engage the periphery of the vehicle tire, the arcuate side portions of said inflatable annulus having sufficient reinforcing rubberized fabric to be capable of transmitting axial load from the radially-outer wall to the radially-inner wall.

7. The structure according to claim 6 wherein the supplemental overtire includes means for transmitting axial thrust from said radially-outer wall to said radially-inner wall, said means comprising at least one circumferential ridge projecting inwardly into said chamber from said radially-inner wall and at least one similar circumferential ridge projecting into said chamber from said radially-outer wall, the side shoulders of said ridges abutting upon axial loads being applied to said overtire.

8. The structure according to claim 6 wherein the means for axially engaging the vehicle tire comprises circumferentially extending ridge portions disposed at either axially-outer portion of said radially-inner wall, said ridge portions having a face thereof which is adapted to engage the radially-outer circumferential marginal side edges of the vehicle tire.

9. The structure according to claim 6 wherein the means for axially engaging the vehicle tire comprise a circumferential annular ridge located on the radially-inner wall of said casing and projecting radially inwardly therefrom to engage a complemental recess provided in the vehicle tire.

10. The structure according to claim 6 wherein one axially-outer portion of said radially-inner wall of said casing is provided with a series of circumferentially-spaced abutments, said abutments extending radially inwardly so as to engage the peripheral side portions of said vehicle tire and facilitate installation of the casing thereon, said abutments also preventing said overtire crossover during sudden loss of air pressure.

11. The combination with a wheel having a rim portion, of a pneumatic overtire comprising an annular resilient casing having an annular chamber therein, said casing comprising a fabric reinforced rubber lining, said casing in cross section having a substantially straight radially-outer wall and a substantially straight radially-inner wall, said walls joined at their axially-outer extremities by arcuate side wall portions, all of said wall portions integrally formed of continuous rubberized fabric, said radially-outer wall having circumferential wire reinforcements spaced at least partially across the width thereof and tread mass on the radially-outer surface thereof, said wire reinforcements being centrally located and being of a substantially narrower width axially than the overtire width, the arcuate side wall portions being more resilient than said wire reinforced center portion, said radially-inner wall being resilient throughout its width, said radially-inner wall being adapted to engage said rim portion of said wheel upon overtire inflation, means for axially engaging said rim portion to prevent axial shift between said overtire and said rim portion when overtire is inflated, said radially-inner wall when said overtire is uninflated having a diameter substantially equal to the diameter of said rim portion, whereby said overtire may be slipped onto said rim portion, and means for introducing air under pressure into said chamber to inflate said overtire, said air pressure forcing radially inwardly the said radially-inner wall to firmly engage said rim portion of said wheel, and said radially-inner wall retracting radially outwardly upon the release of said air pressure to permit easy removal of said overtire.

12. The structure according to claim 11 wherein the supplemental overtire includes means for transmitting axial thrust from said radially-outer wall to said radially-inner wall, said means comprising at least one circumferential ridge projecting inwardly into said chamber from said radially-inner wall and at least one similar circumferential ridge projecting into said chamber from said radially-outer wall, the side shoulders of said ridges abutting upon axial loads being applied to said overtire.

13. The structure according to claim 11 wherein the rim portion has an annular recess and the means for axially engaging said rim portion of said wheel comprises circumferentially extending ridge portions extending radially inwardly from said radially-inner wall, said ridge portions having a face thereon which is adapted to engage a complemental face of the recess, said faces abutting to resist axial load.

14. The structure according to claim 11 wherein at least one axially-outer portion of said radially-inner wall of said casing is provided with a series of circumferentially-spaced abutments, said abutments extending radially inwardly so as to engage the peripheral side portions of said rim of said wheel and facilitate installation of the casing thereon, said abutments also preventing overtire crossover during sudden loss of air pressure.

References Cited in the file of this patent

UNITED STATES PATENTS

| 1,395,770 | Rector | Nov. 1, 1921 |
| 1,599,114 | Clement | Sept. 7, 1926 |
| 1,921,772 | Paull | Aug. 8, 1933 |
| 2,735,471 | McLean | Feb. 21, 1956 |